United States Patent
Hu et al.

(10) Patent No.: US 11,557,086 B2
(45) Date of Patent: Jan. 17, 2023

(54) THREE-DIMENSIONAL (3D) SHAPE MODELING BASED ON TWO-DIMENSIONAL (2D) WARPING

(71) Applicants: SONY GROUP CORPORATION, Tokyo (JP); SONY CORPORATION OF AMERICA, New York, NY (US)

(72) Inventors: Jie Hu, San Jose, CA (US); Mohammad Gharavi-Alkhansari, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 0 days.

(21) Appl. No.: 17/124,622

(22) Filed: Dec. 17, 2020

(65) Prior Publication Data
US 2021/0209839 A1 Jul. 8, 2021

Related U.S. Application Data

(60) Provisional application No. 62/956,416, filed on Jan. 2, 2020.

(51) Int. Cl.
*G06T 17/00* (2006.01)
*G06T 3/00* (2006.01)

(52) U.S. Cl.
CPC ............ *G06T 17/00* (2013.01); *G06T 3/0037* (2013.01); *G06T 3/0093* (2013.01)

(58) Field of Classification Search
None
See application file for complete search history.

(56) References Cited

U.S. PATENT DOCUMENTS 10,095,917 B2 10/2018 Taigman et al.
2011/0157373 A1* 6/2011 Ye .............................. G06T 7/85
348/187

(Continued)

OTHER PUBLICATIONS

Xiangyu Zhu, Z. Lei, Junjie Yan, D. Yi and S. Z. Li, "High-fidelity Pose and Expression Normalization for face recognition in the wild," 2015 IEEE Conference on Computer Vision and Pattern Recognition (CVPR), 2015, pp. 787-796, doi: 10.1109/CVPR.2015.7298679. (Year: 2015).*

(Continued)

*Primary Examiner* — Aaron M Richer
(74) *Attorney, Agent, or Firm* — Chip Law Group

(57) ABSTRACT

An electronic device and method for 3D modeling based on 2D warping is disclosed. The electronic device acquires a color image of a face of a user, depth information corresponding to the color image, and a point cloud of the face. A 3D mean-shape model of a reference 3D face is acquired, and rigid aligned with the point cloud. A 2D projection of the aligned 3D mean-shape model is generated. The 2D projection includes a set of landmark points associated with the aligned 3D mean-shape model. The 2D projection is warped such that the set of landmark points in the 2D projection is aligned with a corresponding set of feature points in the color image. A 3D correspondence between the aligned 3D mean-shape model and the point cloud is determined for a non-rigid alignment of the aligned 3D mean-shape model, based on the warped 2D projection and the depth information.

12 Claims, 8 Drawing Sheets

(56) References Cited

U.S. PATENT DOCUMENTS

| | | | |
|---|---|---|---|
| 2018/0068178 A1* | 3/2018 | Theobalt | G06T 7/50 |
| 2018/0253593 A1* | 9/2018 | Hu | G06T 17/00 |
| 2019/0012578 A1* | 1/2019 | Bhagavatula | G06V 40/165 |
| 2019/0035149 A1 | 1/2019 | Chen et al. | |
| 2019/0259214 A1* | 8/2019 | Abdrashitov | G06T 13/40 |
| 2020/0084427 A1* | 3/2020 | Sun | G06N 3/0454 |
| 2021/0150787 A1* | 5/2021 | Deng | G06T 3/0093 |

OTHER PUBLICATIONS

Jiang, et al., "3D Face Reconstruction with Geometry Details from a Single Image", IEEE, Transactions on Image Processing, Jun. 11, 2018, 14 pages.

Zhu, et al., "High-fidelity Pose and Expression Normalization for Face Recognition in the Wild", IEEE, Conference an Computer Vision and Pattern Recognition (CVPR), Oct. 15, 2015, pp. 787-796.

Schaefer, et al., "Image deformation using moving least squares", ACM Transactions on Graphics, vol. 25, No. 3, Jul. 2006, 08 pages.

\* cited by examiner

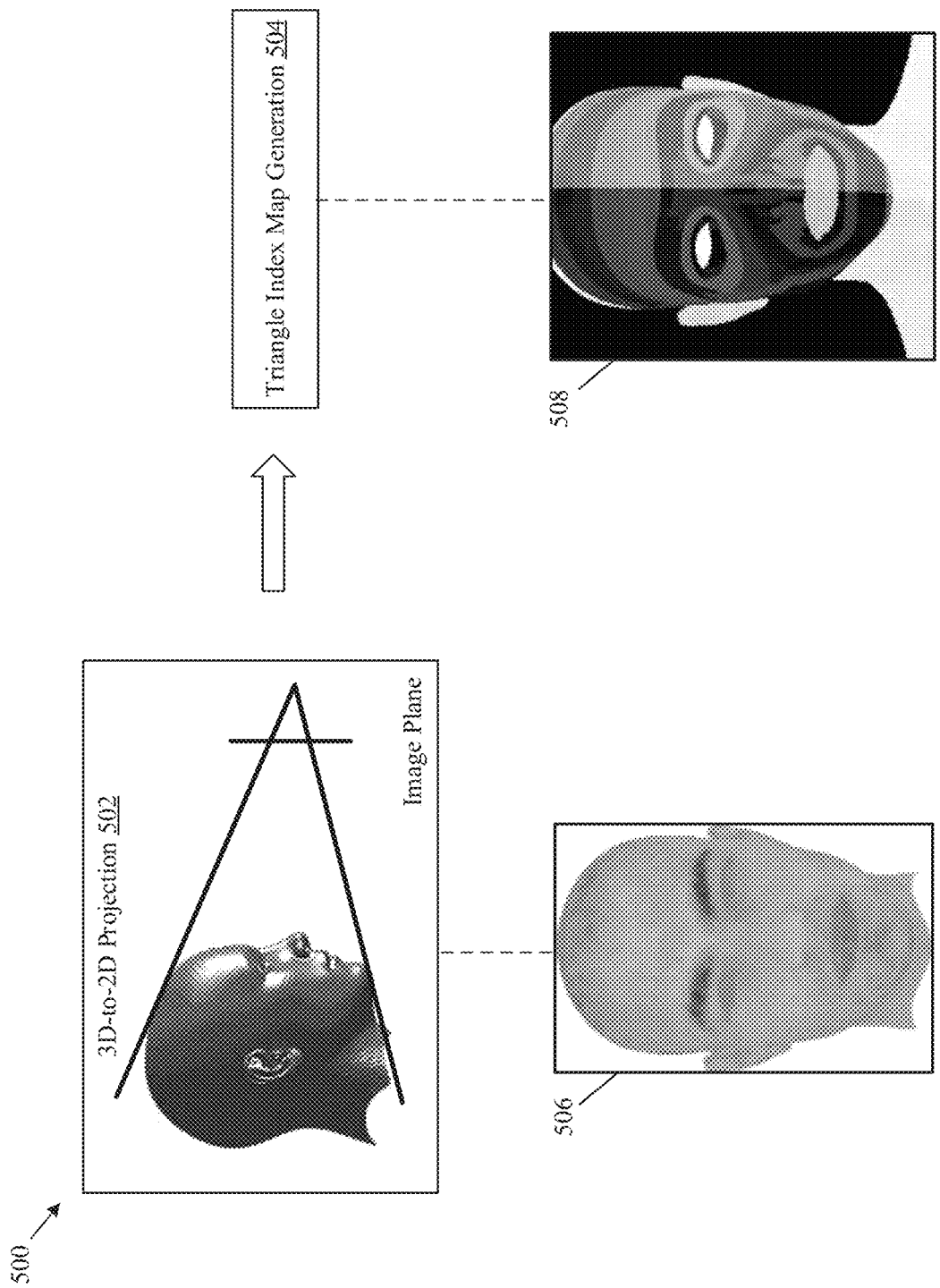

US 11,557,086 B2

THREE-DIMENSIONAL (3D) SHAPE MODELING BASED ON TWO-DIMENSIONAL (2D) WARPING

CROSS-REFERENCE TO RELATED APPLICATIONS/INCORPORATED BY REFERENCE

This application claims priority to U.S. Provisional Patent Application Ser. No. 62/956,416 filed on Jan. 2, 2020, the entire content of which is hereby incorporated herein by reference.

FIELD

Various embodiments of the disclosure relate to three-dimensional (3D) modeling and virtual human modelling. More specifically, various embodiments of the disclosure relate to an electronic device and method for 3D shape modeling based on two-dimensional (2D) warping.

BACKGROUND

Advancements in the field of three-dimensional (3D) computer graphics have provided the ability to create 3D models and visualize real objects in a 3D computer graphics environment. 3D content, such as a 3D character model, is increasingly used in animated movies, games, and virtual-reality systems to enhance user experience. A 3D model is a static 3D mesh that resembles the shape of a particular object. Typically, such a 3D model is manually designed by computer graphics artists, commonly known as modelers, by use of a modeling software application. Such a 3D model may not be used in the same way in animation, or various virtual reality systems or applications. Further, in some instances, a face portion of the 3D model may be considered as one of the most important portions of the 3D model. Currently, creating a realistic 3D human face model has been one of the most difficult problems in the fields of computer graphics and computer vision. With the increasing application of 3D virtual human technology in the areas of virtual reality, 3D gaming, and virtual simulation, developing technologies to generate a realistic 3D human face model based on real people has become increasingly important.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for a three-dimensional (3D) shape modeling based on two-dimensional (2D) warping is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 5 is a diagram that illustrates an exemplary scenario for generation of a two-dimensional (2D) projection of an aligned three-dimensional (3D) mean-shape model, in accordance with an embodiment of the disclosure.

DETAILED DESCRIPTION

Figure 1:
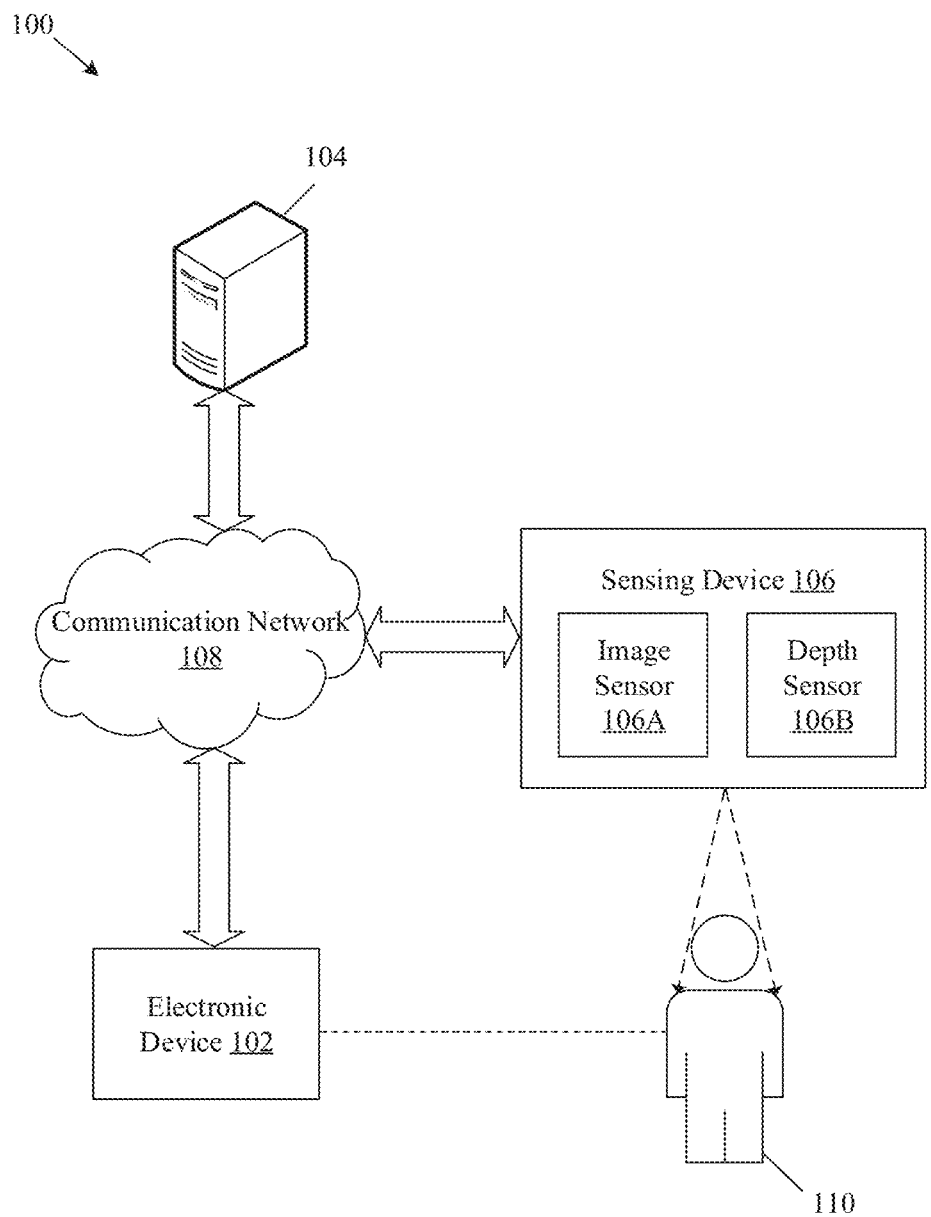
FIG. 1 is a block diagram that illustrates an exemplary network environment for three-dimensional (3D) shape modeling based on two-dimensional (2D) warping, in accordance with an embodiment of the disclosure.

The following described implementations may be found in the disclosed electronic device and method for three-dimensional (3D) shape modeling based on two-dimensional (2D) warping. Exemplary aspects of the disclosure may include the electronic device that may be communicatively coupled to a sensing device. The sensing device may include an image sensor and a depth sensor, for example. The image sensor may capture a color image of a face of a user. The depth sensor may determine depth information corresponding to the color image of the face. The electronic device may acquire the color image from the image sensor and the depth information from the depth sensor. The electronic device may further acquire a point cloud of the face based on the acquired color image and the acquired depth information. The point cloud may include a set of data points usually defined by "X, Y, and Z" coordinates a 3D coordinate system and may represent a spatially sampled surface of an object, such as, a face portion of the user.

The electronic device may include a memory device configured to store a 3D mean-shape model and a plurality of shape components of a reference 3D face. The stored 3D mean-shape model and a plurality of shape components may be collectively referred to as, for example, a principle component analysis (PCA) model or a 3D morphable model. The PCA model may be built from a scanning and registering of a plurality of different faces, for example, about 100-300 faces of different users. At first, the electronic device may align the acquired 3D mean-shape model by a rigid alignment of the acquired 3D mean-shape model with the acquired point cloud. Further, the electronic device may generate a two-dimensional (2D) projection of the aligned 3D mean-shape model. The generated 2D projection may include landmark points associated with the aligned 3D mean-shape model. To generate the 2D projection of the aligned 3D mean-shape model, the electronic device may project the aligned mean-shape model onto a 2D image plane based on one or more alignment parameters associated with an imaging device (e.g., the image sensor) which captured the color image. The electronic device may warp the generated 2D projection such that the landmark points in the generated 2D projection are aligned with corresponding feature points in the acquired color image of the face. Thereafter, for a non-rigid alignment of the aligned 3D mean-shape model, the electronic device may determine a 3D correspondence between the aligned 3D mean-shape model and the acquired point cloud. The 3D correspondence may be determined based on the warped 2D projection and the acquired depth information.

The determination of the 3D correspondence between the aligned 3D mean-shape model and the acquired point cloud based on such warped 2D projection may lead to a more accurate non-rigid alignment of the aligned 3D mean-shape model, as compared to conventional methods, such as a 3D deformation for a non-rigid alignment. As 2D warping may be performed between two 2D images (i.e., the 2D projection and the acquired color image), the process may have a lower time-complexity as compared to conventional solutions that may process the 3D mean-shape model and the point cloud as a whole.

FIG. 1 is a block diagram that illustrates an exemplary network environment for three-dimensional (3D) shape modeling based on two-dimensional (2D) warping, in accordance with an embodiment of the disclosure. With reference to FIG. 1, there is shown a network environment 100. The network environment 100 may include an electronic device 102, a server 104, a sensing device 106 and a communication network 108. There is further shown a user 110 who may be associated with the electronic device 102. The sensing device 106 may include an image sensor 106A and a depth sensor 106B. The electronic device 102 may be communicatively coupled to the server 104 and the sensing device 106, via the communication network 108.

In FIG. 1, the server 104 and the sensing device 106 are shown as two entities which are separate from the electronic device 102. In some embodiments, some or all of the functionalities of the server 104 and/or the sensing device 106 may be incorporated in the electronic device 102, without a deviation from the scope of the present disclosure.

The electronic device 102 may include suitable logic, circuitry, interfaces, and/or code that may be configured to generate a 3D shape model of a face of a user. As an example, the 3D shape model may be a 3D face model of a face of the user 110. The 3D face model may include a plurality of feature points, such as eyes, eyebrows, nose, ears, and/or other similar features which define a human face. Examples of the electronic device 102 may include, but are not limited to, a computing device, a video-conferencing system, an augmented reality-based device, a gaming device, a mainframe machine, a server, a computer workstation, and/or a consumer electronic (CE) device.

The server 104 may include suitable circuitry, interfaces, and/or code that may be configured to store a 3D mean-shape model, which may be obtained by application of dimensionality reduction (such as principle component analysis (PCA)) on a set of reference faces meshes. For example, the server 104 may store the 3D mean-shape model of a reference 3D face in a neutral expression and a plurality of shape components of the 3D mean-shape model as a part of the stored 3D mean-shape model. The server 104 may be configured to also store a plurality of arbitrary facial expressions related to the 3D mean-shape model. Examples of the server 104 may include, but are not limited to, an application server, a cloud server, a web server, a database server, a file server, a gaming server, a mainframe server, or a combination thereof.

The sensing device 106 may include suitable logic, circuitry, interfaces, and/or code that may be configured to capture a color image and corresponding depth information of the face of the user 110. The sensing device 106 may be configured to transmit the captured color image and the corresponding depth information to the electronic device 102, via the communication network 108. The sensing device 106 may include a plurality of sensors, such as a combination of a depth sensor, a color sensor, (such as a red-green-blue (RGB) sensor), and/or an infrared (IR) sensor which may capture the face of the user from a particular viewing angle. Example implementations of the sensing device 106 may include, but are not limited to, a depth sensor, a Light Detection and Ranging (LiDAR), a Time-of-Flight (ToF) sensor, a sensor which implements Structure-from-motion (SfM), an IR sensor, an image sensor, a structured-light 3D scanner, a hand-held laser scanner, a modulated light 3D scanner, a stereoscopic camera, a camera array, and/or a combination thereof. In one embodiment, the sensing device 106 may be implemented as a component of the electronic device 102.

The image sensor 106A may include suitable logic, circuitry, and interfaces that may be configured to capture the color image of the face of the user 110. Examples of the image sensor 106A may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices.

The depth sensor 106B may include suitable logic, circuitry, and interfaces that may be configured to capture the depth information corresponding to the color image of the face of the user 110. Examples of the depth sensor 106B may include, but are not limited to, a stereo camera-based sensor, a ToF depth sensor, a Light Detection And Ranging (LiDAR)-based depth sensor, a Radio Detection And Ranging (RADAR)-based depth sensor, an ultrasonic depth sensor, and/or other depth/proximity sensors.

The communication network 108 may include a communication medium through which the electronic device 102 may be communicatively coupled to the server 104 and the sensing device 106. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN), a mobile wireless network, such as a Long-Term Evolution (LTE) network (for example, 4th Generation or 5th Generation (5G) mobile network (i.e. 5G New Radio)). Various devices of the network environment 100 may be configured to connect to the communication network 108, in accordance with various wired or wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, Bluetooth (BT) communication protocols, or a combination thereof.

In operation, the sensing device 106 may be configured to capture a color image and corresponding depth information of a face of the user 110 from a particular viewpoint (such as a front view of a face). For example, the image sensor 106A may capture an RGB color image of the face of the user 110 and the depth sensor 106B may capture the depth information corresponding to the RGB color image of the face. Together, the sensing device 106 may capture RGB-Depth (RGBD) data of the face of the user 110.

The sensing device 106 may be configured to transmit the captured color image and the depth information corresponding to the color image of the face of the user 110, to the electronic device 102, via the communication network 108. In an embodiment, the electronic device 102 may acquire the color image of the face of the user 110 and the depth information corresponding to the color image of the face of the user 110 from the sensing device 106. Also, the electronic device 102 may be configured to acquire a point cloud of the face. In an embodiment, the point cloud may be acquired based on the acquired color image and the corresponding depth information of the face of the user 110.

The electronic device 102 may be further configured to acquire a 3D mean-shape model of a reference 3D face. In one embodiment, the 3D mean-shape model may be acquired from the server 104 in case the 3D mean-shape model is stored on the server 104. Once acquired, the electronic device 102 may be configured to store the 3D mean-shape model of the reference 3D face in a neutral expression and a plurality of shape components. The 3D mean-shape model and the plurality of shape components may be a part of a 3D morphable model and may be constructed by applying dimensionality reduction on a set of reference facial meshes. The model may act as a prior to reconstruct a 3D model of a face of the user 110 from 2D images or depth scans of the face. For example, the 3D mean-shape model and the plurality of shape components may be a Principle Component Analysis (PCA) model, which may be built from a set of reference faces meshes, for example, about 100-300 faces of different subjects. The application of dimensionality reduction may help to identify and extract certain key uncorrelated data components from a large set of correlated data components.

The electronic device 102 may be further configured to align the acquired 3D mean-shape model by a rigid alignment of the acquired 3D mean-shape model with the acquired point cloud. The electronic device 102 may be further configured to generate a 2D projection of the aligned 3D mean-shape model. The generated 2D projection may include a set of landmark points associated with the aligned 3D mean-shape model. The electronic device 102 may be configured to warp the generated 2D projection such that the set of landmark points in the generated 2D projection is aligned with a corresponding set of feature points in the acquired color image of the face. For a non-rigid alignment of the aligned 3D mean-shape model, the electronic device 102 may be configured to determine a 3D correspondence between the aligned 3D mean-shape model and the acquired point cloud. The determination of such correspondence may be based on the warped 2D projection and the acquired depth information. Such determination of the 3D correspondence is explained, for example, in FIG. 3. Various operations of the electronic device 102 for the 3D shape modeling based on the 2D warping operation are described further, for example, in FIGS. 3, 4A, 4B, 5, 6, and 7.

Figure 2:
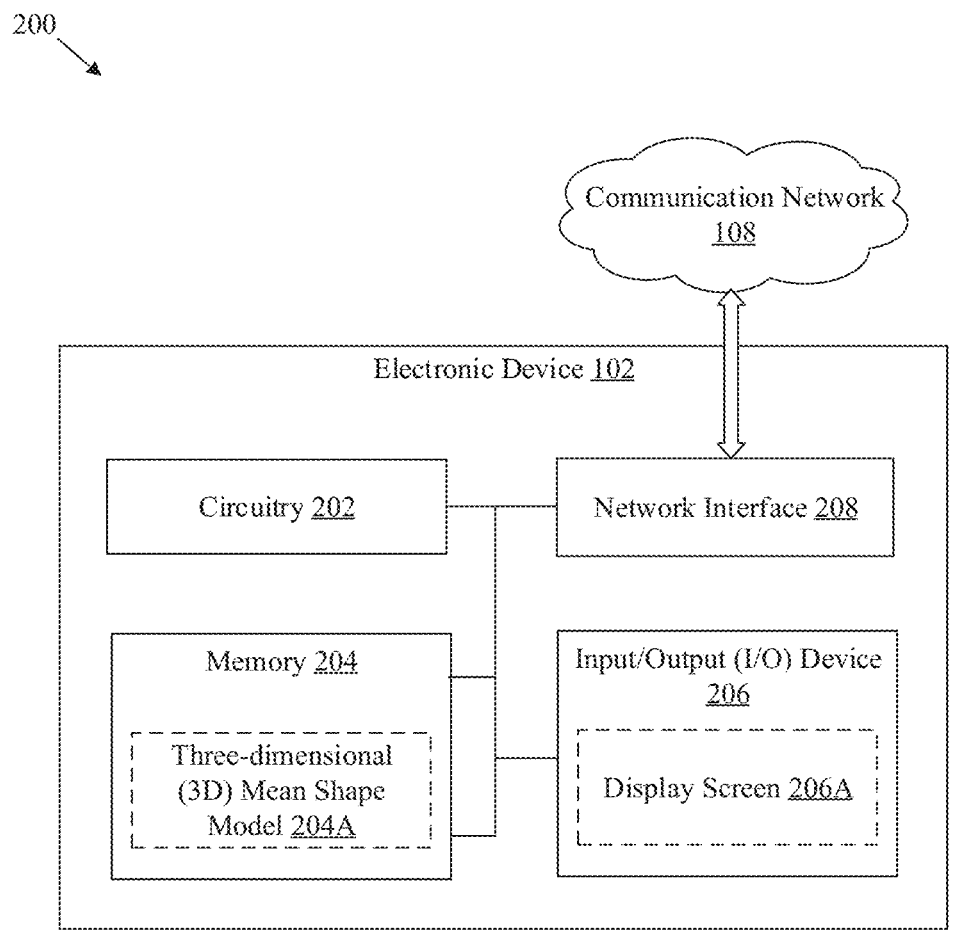
FIG. 2 is a block diagram that illustrates an exemplary electronic device for three-dimensional (3D) shape modeling, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the electronic device 102. The electronic device 102 may include circuitry 202, a memory 204, an input/output (I/O) device 206, and a network interface 208. The memory 204 may store a 3D mean-shape model 204A of a reference 3D face. The I/O device 206 may include a display screen 206A. The circuitry 202 may be communicatively coupled to the memory 204, the I/O device 206, and the network interface 208. The circuitry 202 may be configured to communicate with the server 104 and the sensing device 106, by use of the network interface 208.

The circuitry 202 may include suitable logic, circuitry, and interfaces that may be configured to execute program instructions associated with different operations to be executed by the electronic device 102. The circuitry 202 may be implemented based on a number of processor technologies known in the art. Examples of the processor technologies may include, but are not limited to, a Central Processing Unit (CPU), an x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

The memory 204 may include suitable logic, circuitry, and/or interfaces that may be configured to store a set of instructions executable by the circuitry 202. The memory 204 may be configured to store operating systems and associated applications. In accordance with an embodiment, the memory 204 may be also configured to store a 3D mean-shape of a PCA model of a reference 3D face. In an embodiment, the server 104 may be configured to store the 3D mean-shape model 204A of the reference 3D face in a neutral expression and a plurality of shape components as a part of the stored PCA model (or 3D morphable model). Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input from the user 110. The I/O device 206 may be further configured to provide an output to the user 110. The I/O device 206 may include various input and output devices, which may be configured to communicate with the circuitry 202. Examples of the input devices may include, but are not limited to, a touch screen, a keyboard, a mouse, a joystick, and/or a microphone. Examples of the output devices may include, but are not limited to, the display screen 206A and/or a speaker.

The display screen 206A may include suitable logic, circuitry, interfaces, and/or code that may be configured to render an application interface to display a 3D face model (such as an aligned 3D mean-shape model). In accordance with an embodiment, the display screen 206A may be a touch screen, where input from the user 110 may be received via the application interface. The display screen 206A may capture the input based on an input received from the user 110. The user 110 may be able to provide inputs with the help of a plurality of buttons or UI elements displayed on the touch screen. The touch screen may correspond to at least one of a resistive touch screen, a capacitive touch screen, or a thermal touch screen. In accordance with an embodiment, the display screen 206A may receive the input through a virtual keypad, a stylus, a gesture-based input, and/or a touch-based input. The display screen 206A may be realized through several known technologies such as, but not limited to, at least one of a Liquid Crystal Display (LCD) display, a Light Emitting Diode (LED) display, a plasma display, and/or an Organic LED (OLED) display technology, and/or other display. In accordance with an embodiment, the display screen 206A may refer to a display screen of smart-glass device, a see-through display, a projection-based display, an electro-chromic display, and/or a transparent display.

The network interface 208 may include suitable logic, circuitry, code, and/or interfaces that may be configured to facilitate communication between the circuitry 202, the server 104, and the sensing device 106, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), a 5th generation network such as 5G new radio (NR) network, a 5G smart antenna, time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The network interface 208 may be capable to communicate with a 5G communication network and will include appropriate 5G support functionality such as, but not limited to, a 5G NR, a V2X Infrastructure, and a 5G Smart Antenna. Various operations of the circuitry 202 for the 3D shape modeling based on the 2D warping are described further, for example, in FIGS. 3, 4A, 4B, 5, 6, and 7.

Figure 3:
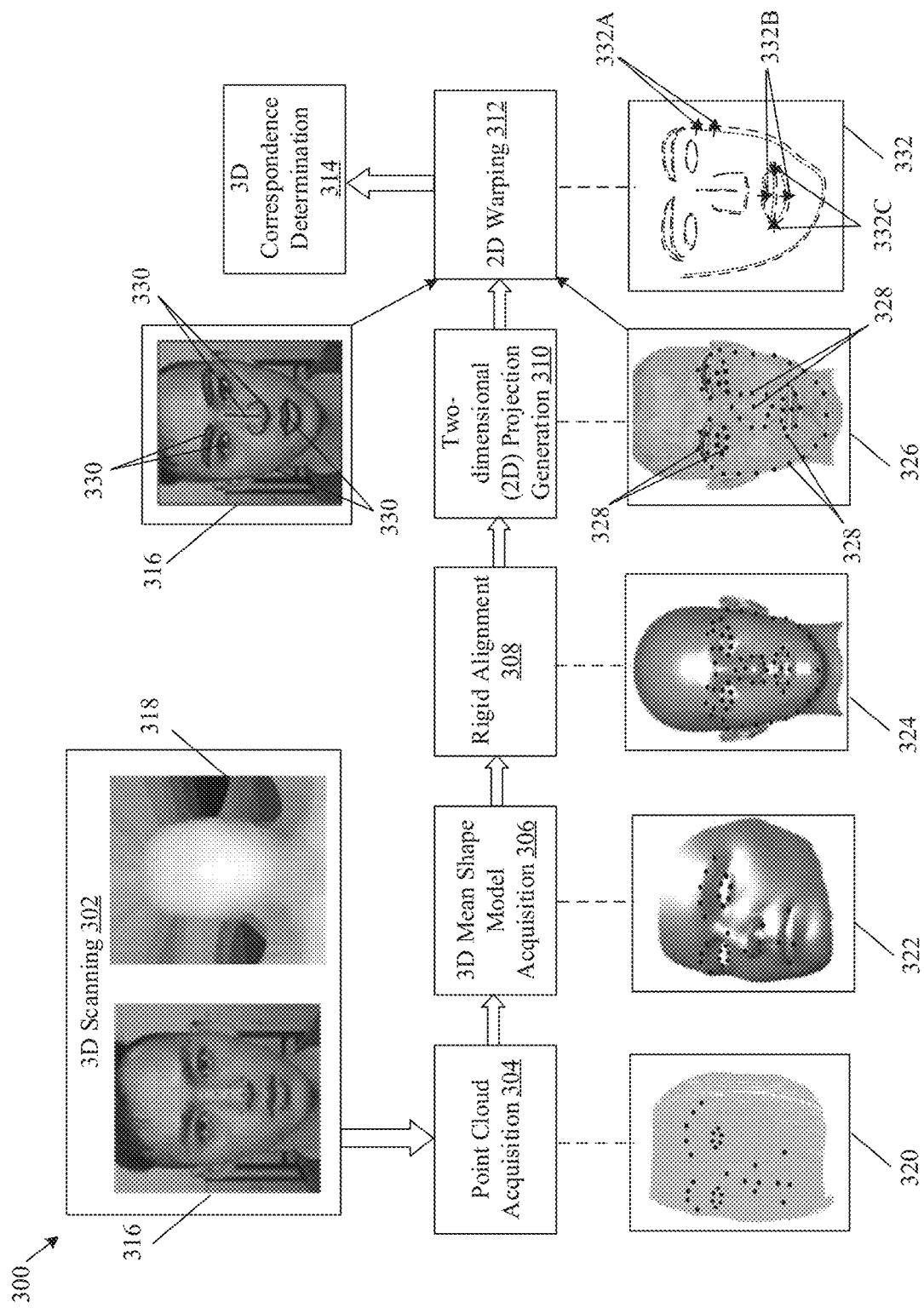
FIG. 3 is a diagram that illustrates the exemplary processing pipeline for three-dimensional (3D) shape modeling based on two-dimensional (2D) warping, in accordance with an embodiment of the disclosure.

FIG. 3 is a diagram that illustrates an exemplary processing pipeline for three-dimensional (3D) shape modeling based on two-dimensional (2D) warping, in accordance with an embodiment of the disclosure. FIG. 3 is explained in conjunction with elements from FIG. 1 and FIG. 2. With reference to FIG. 3, there is shown a processing pipeline of operations from 302 to 314 to depict 3D shape modeling based on 2D warping.

At 302, a 3D scan of a face of the user 110 may be executed. In an embodiment, the sensing device 106 may be configured to execute the 3D scan of the face of the user 110. For the 3D scan, the image sensor 106A of the sensing device 106 may capture a color image 316 of the face of the user 110. Further, the depth sensor 106B of the sensing device 106 may capture depth information 318 corresponding to the color image 316 of the face of the user 110. For example, the depth sensor 106B may capture the depth information 318 (represented as a gray scale image), which may include depth values corresponding to a number of pixels in the color image 316 of the face. The captured depth information 318 of the face may include information about "Z" coordinates of the face of the user 110. For example, an amount of protrusion, such as a mole, protuberance of a nose, a depth of cheek region with respect to a forehead region, and depths of other regions of the face may not be estimated with accuracy without the depth information 318 of each region of the face of the user 110.

In an embodiment, the color image 316 and the corresponding depth information 318 may be aligned with each other such that the color image 316 and the corresponding depth information 318 of the face of the user 110 may correspond to a common viewpoint (such as a front view of the face). The alignment of the color image 316 and corresponding depth information 318 may be done by use of a suitable alignment method (which may be known to one skilled in the art). While the color image 316 may determine 2D position and texture of points sampled from the face of the user 110, the depth information 318 may add depth or z-values to such points. Having both the depth information 318 and the corresponding color image 316 from a particular viewpoint (such as a common frontal viewpoint) may provide enhanced understanding of the shape, different facial features, and depth of each region of face from a three dimensional perspective retaining intricate details of the face of the user 110.

The sensing device 106 may be configured to transmit the color image 316 and corresponding depth information 318 of the face of the user 110 to the electronic device 102, via the communication network 108. Alternatively, the circuitry 202 may acquire the color image 316 and the corresponding depth information 318 from the sensing device 106. For example, in a scenario where the sensing device 106 is implemented as a component of the electronic device 102, the circuitry 202 of the electronic device 102 may acquire the color image 316 and the corresponding depth information 318 from the sensing device 106.

At 304, a point cloud 320 may be acquired. In an embodiment, the circuitry 202 may be configured to acquire the point cloud 320 based on the received color image 316 and the received corresponding depth information 318. For example, a bounding box may be detected around the face of the user 110 in the color image 316 and the corresponding depth information 318. Thereafter, points inside the detected bounding box may be projected to a 3D space to obtain the point cloud 320. The point cloud 320 may include a set of 3D points, usually defined by "X, Y, and Z" coordinates in a 3D coordinate system. In its 3D representation, the point cloud 320 may spatially sample a surface portion of the face for a 3D representation of various facial features, such as eyes, nose, lips, ears, cheeks, or jaws.

At 306, the 3D mean-shape model 204A may be acquired. In an embodiment, the circuitry 202 may be configured to acquire the 3D mean-shape model 204A of a reference 3D face. In an embodiment, the circuitry 202 may acquire the 3D mean-shape model 204A from a data source, such as the server 104 and may store the acquired 3D mean-shape model 204A in the memory 204. Details associated with the 3D mean-shape model 204A are provided, for example, in FIG. 1.

At 308, a rigid alignment of the 3D mean-shape model may be executed. The circuitry 202 may be configured to align the acquired 3D mean-shape model (e.g., a 3D mean-shape model 322) by a rigid alignment of the acquired 3D mean-shape model 322 with the acquired point cloud 320. The circuitry 202 may use a face modeler to estimate an affine transformation between the 3D coordinates of a set of feature points on the point cloud 320 and a corresponding set of landmark points on the 3D mean-shape model 322. In accordance with an embodiment, the affine transformation may be estimated to rigid-align the set of feature points of the point cloud 320 of the face of the user 110 with the corresponding set of landmark points on the 3D mean-shape model 322.

The circuitry 202 may use the face modeler to estimate the affine transformation to align the set of feature points on several facial features, such as eyes, nose, lips, or cheeks. For example, the affine transformation may be estimated by equation (1), as follows:

$$\begin{bmatrix} f'_x \\ f'_y \\ f'_z \end{bmatrix} = R \begin{bmatrix} f_x \\ f_y \\ f_z \end{bmatrix} + t \quad (1)$$

where, f may represent the set of landmarks of the 3D mean-shape model 322,
f' may represent the set of the feature points of the point cloud 320,
R may represent a rotation matrix, and
t may represent a translation matrix.

In order to obtain an aligned 3D mean-shape model 324, the estimated affine transformation may be applied on the 3D mean-shape model 322. For example, the affine transformation (R, t) may be applied by equation (2), as follows:

$$\tilde{v} = Rv + t \quad (2)$$

where, "v" may represent the 3D mean-shape model 322, $\tilde{v}$ may represent the aligned 3D mean-shape model 324, and "R" and "t" may represent the rotation and translation applied on the 3D mean-shape model 322.

At 310, a 2D projection 326 of the aligned 3D mean-shape model 324 may be generated. In an embodiment, the circuitry 202 may be configured to generate the 2D projection 326 of the aligned 3D mean-shape model 324. The generated 2D projection 326 may include a set of landmark points (such as a set of landmark points 328) associated with the aligned 3D mean-shape model 324. The set of landmark points 328 in the generated 2D projection 326 may be points that may define key face features of the aligned 3D mean-shape model 324. Examples of such face features may include, but are not limited to, a face contour, lips, mouth, nose, eyes, eyebrows, and ears. The projection of the aligned 3D mean-shape model 324 for the generation of the 2D projection 326 is described further, for example, in FIG. 5.

In an embodiment, the circuitry 202 may acquire a plurality of pre-defined landmark points on the aligned 3D mean-shape model 324. Indices of such pre-defined landmark points are already known. There may be one complication at the contour of the face as the contour points around the face in the color image 316 may not correspond to a fixed set of points on the aligned 3D mean-shape model 324 and such correspondence may depend on the viewing angle of the sensing device 106. In order to solve this issue, a landmark marching method may be used to select indices of landmarks on the contour of the aligned mean-shape model 324 from among the acquired plurality of pre-defined landmark points.

The circuitry 202 may apply the landmark marching method on a subset of landmark points around a contour of the aligned 3D mean-shape model 324 to select a set of landmark points from among the acquired plurality of pre-defined landmark points. Herein, the subset of landmark points may be a part of the acquired plurality of pre-defined landmark points. Further, the generated 2D projection 326 may include the selected set of landmark points. For example, as shown in FIG. 3, the 2D projection 326 may include the set of landmark points 328, which may be selected from among the acquired plurality of pre-defined landmark points on the aligned 3D mean-shape model 324. The selection of the set of landmark points 328 based on the landmark marching method is described further, for example, in FIGS. 4A and 4B.

At 312, a 2D warping of the generated 2D projection 326 may be executed. In an embodiment, the circuitry 202 may warp the generated 2D projection 326 based on the acquired color image 316. As shown in FIG. 3, the acquired color image 316 may include the set of feature points 330, which may be associated with features of the face such as, but not limited to, a face contour, lips, mouth, nose, eyes, eyebrows, and ears. The circuitry 202 may warp the generated 2D projection 326 such that the set of landmark points 328 in the generated 2D projection 326 is aligned with the corresponding set of feature points 330 in the acquired color image 316 of the face of the user 110. As shown, for example, the circuitry 202 may warp the generated 2D projection 326 to generate a warped 2D projection.

Shown as an example, the set of landmark point 328 and the corresponding set of feature points 330 may be as splines 332. For alignment of the set of landmark point 328 with the corresponding set of feature points 330, a spline on the right side of the face in the 2D projection 326 may be shifted towards the right (as shown by a first set of arrows 332A) to overlap a corresponding spline on the face in the color image 316. Similarly, splines on both an upper lip and a lower lip of the face in the 2D projection 326 may be shifted downwards (as shown by a second set of arrows 332B) to overlap an upper lip and a lower lip of the face in the color image 316, respectively. Further, splines on a left end of the lips and a right end of the lips of the face in the 2D projection 326 may be shifted rightwards and leftwards, respectively (as shown by a third set of arrows 332C) to overlap the left and the right ends of the lips in the color image 316. The warping of the generated 2D projection 326 is described further, for example, in FIG. 6.

At 314, a 3D correspondence may be determined. In an embodiment, the circuitry 202 may be configured to determine the 3D correspondence between the aligned 3D mean-shape model 324 and the acquired point cloud 320 for a non-rigid alignment of the aligned 3D mean-shape model 324. The 3D correspondence may be determined based on the warped 2D projection and the depth information 318. The determination of the 3D correspondence is described further, for example, in FIG. 7.

The set of landmark points 328 associated with the aligned 3D mean-shape model 324 in the generated 2D projection 326 may be points that may define key features of an aligned reference 3D face represented in the aligned 3D mean-shape model 324. Examples of such key features may include, but are not limited to, a face contour, lips, mouth, nose, eyes, eyebrows, and ears. The set of feature points 330 in the acquired color image 316 of the face of the user 110 may be points that also correspond to similar key features of the face in the acquired color image 316 of the face. The generated 2D projection 326 may be warped based on the alignment of the set of landmark points 328 in the generated 2D projection 326 with the corresponding set of feature points 330 in the acquired color image 316. The determination of the 3D correspondence between the aligned 3D mean-shape model 324 and the acquired point cloud 320 based on such warped 2D projection (as obtained by alignment of the splines 332, for example) may lead to a more accurate non-rigid alignment of the aligned 3D mean-shape model 324, as compared to conventional solutions. Further, as the 2D warping may be executed between two 2D images (i.e., the 2D projection 326 and the acquired color image 316), the process may have a lower time-complexity as compared to conventional solutions that may process the 3D mean-shape model and the point cloud as a whole.

Figures 4A, 4B:
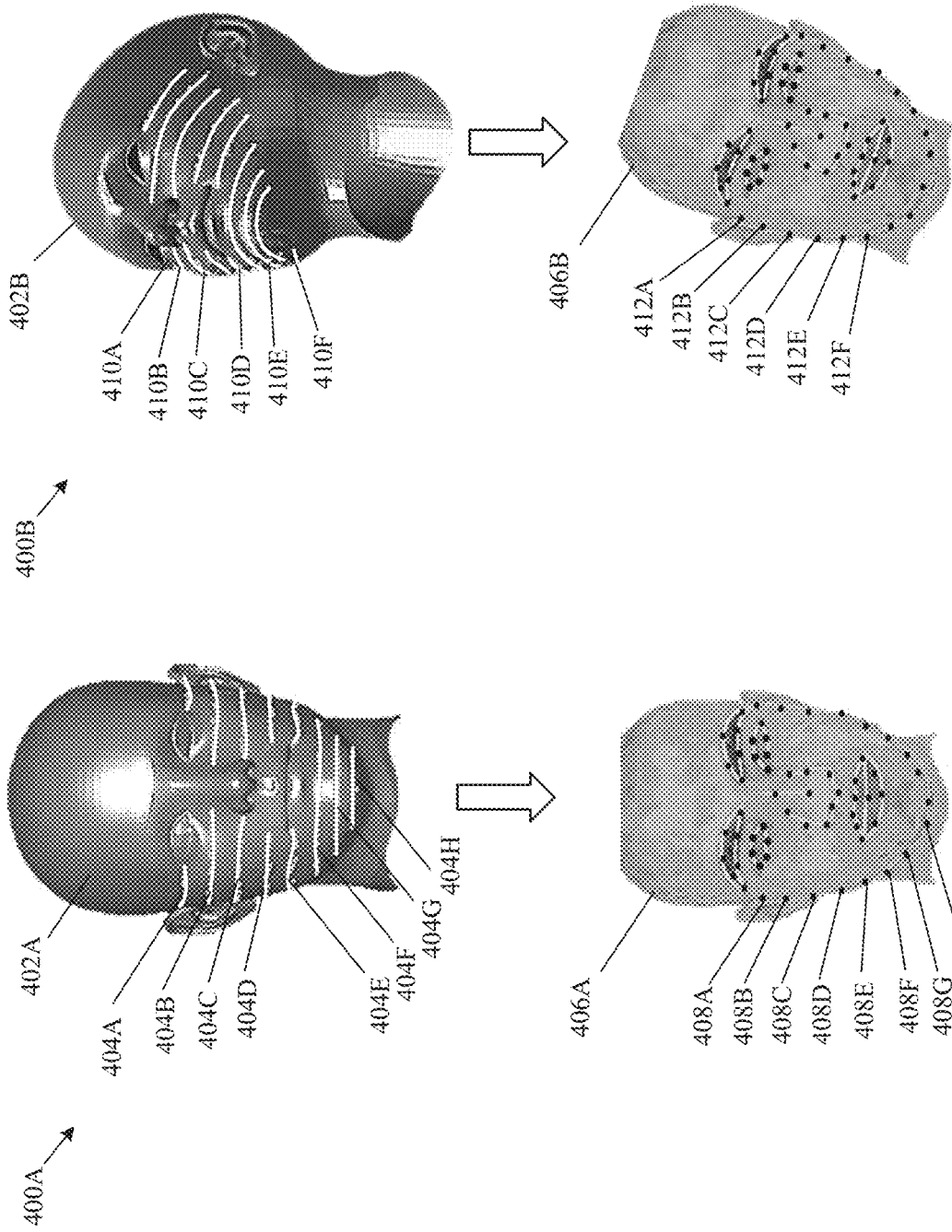
FIG. 4A is a diagram that illustrates an exemplary scenario for selection of a set of landmark points on a two-dimensional (2D) projection based on a landmark marching method, in accordance with an embodiment of the disclosure.
FIG. 4B is a diagram that illustrates another exemplary scenario for selection of a set of landmark points on a two-dimensional (2D) projection based on a landmark marching method, in accordance with an embodiment of the disclosure.

FIG. 4A is a diagram that illustrates an exemplary scenario for selection of a set of landmark points based on a landmark marching method, in accordance with an embodiment of the disclosure. FIG. 4A is described in conjunction with elements from FIGS. 1, 2, and 3. With reference to FIG. 4A, there is shown an exemplary first scenario 400A. The first scenario 400A may include a first aligned 3D mean-shape model 402A. In an example, as shown in FIG. 4A, the first aligned 3D mean-shape model 402A may be associated with a frontal view of the face of the user 110. The first scenario 400A further includes a first 2D projection 406A. The circuitry 202 may generate the first 2D projection 406A from the first aligned 3D mean-shape model 402A.

In an embodiment, the circuitry 202 may acquire a plurality of pre-defined landmark points on the first aligned 3D mean-shape model 402A. The circuitry 202 may select a subset of landmark points around a contour of the first aligned 3D mean-shape model 402A. The subset of landmark points may be considered to be included in the acquired plurality of pre-defined landmark points. Further, the circuitry 202 may apply a landmark marching method on the subset of landmark points to select a set of landmark points from among the acquired plurality of pre-defined landmark points. To apply the landmark marching method, the circuitry 202 may acquire indices of points that may lie on pre-defined parallel lines between the subset of landmark points. Such indices of points, which may be candidates for feature points on the contour, are pre-defined. Candidates of IDs for each feature point may be grouped together and the search of the ID for that feature point will be inside the group (the groups of candidates for different feature points forms parallel lines).

As the first aligned 3D mean-shape model 402A may be associated with a frontal view of the face of the user 110, a left-most vertex and a right-most vertex of each of the parallel lines may be same as a left most landmark point and a right most landmark point on the contour of the face in the first aligned 3D mean-shape model 402A. This may be because in a frontal view of the face, there may be minimal or no occlusion at both the left side and the right side of the face. Thus, in the current case, there may be a one-to-one correspondence between the subset of landmark points on the first aligned 3D mean-shape model 402A and landmark points to be selected from among the acquired plurality of pre-defined landmark points as the set of landmark points for the first 2D projection 406A. As an example, vertices 404A, 404B, 404C, 404D, 404E, 404F, 404G, and 404H may be the left-most vertices on the parallel lines and may also be landmark points on the left portion contour of the face in the first aligned 3D mean-shape model 402A. Thus, the vertices 404A, 404B, 404C, 404D, 404E, 404F, 404G, and 404H may lie on the contour of the face and be landmark points themselves. The circuitry 202 may determine landmark points 408A, 408B, 408C, 408D, 408E, 408F, 408G, and 408H in the first 2D projection 406A as landmark points on the contour of the face, which may correspond to the vertices 404A, 404B, 404C, 404D, 404E, 404F, 404G, and 404H, based on the landmark marching method.

FIG. 4B is a diagram that illustrates another exemplary scenario for selection of a set of landmark points based on a landmark marching method, in accordance with an embodiment of the disclosure. With reference to FIG. 4B, there is shown an exemplary second scenario 400B. The second scenario 400B includes a second aligned 3D mean-shape model 402B associated with a non-frontal view of the face of the user 110. As an example, the non-frontal view of the face of the user 110 may be a view in which the face of the user 110 may be titled towards the left-side. The second scenario 400B further includes a second 2D projection 406B. The circuitry 202 may generate the second 2D projection 406B from the second aligned 3D mean-shape model 402B.

In an embodiment, the circuitry 202 may acquire a plurality of pre-defined landmark points on the second aligned 3D mean-shape model 402B. The circuitry 202 may select a subset of landmark points around a contour of the second aligned 3D mean-shape model 402B. The subset of landmark points may be considered to be included in the acquired plurality of pre-defined landmark points. Further, the circuitry 202 may apply a landmark marching method on the subset of landmark points to select a set of landmark points from among the detected plurality of landmark points. To apply the landmark marching method, the circuitry 202 may acquire indices of points that may lie on pre-defined parallel lines between the subset of landmark points. As the second aligned 3D mean-shape model 402B may be associated with the non-frontal view of the face of the user 110 in which the face of the user 110 may be titled towards the left-side, a portion of the left-side of the face may be occluded. Hence, there may not be a one-to-one correspondence between the subset of landmark points on the second aligned 3D mean-shape model 402B and landmark points which may have to be selected from among the acquired plurality of pre-defined landmark points as the set of landmark points for the second 2D projection 406B. Based on an application of the landmark marching method on the subset of landmark points, the circuitry 202 may select the left-most vertices on each parallel line as landmark points for the left portion of the contour of the face on the second 2D projection 406B. This may be because the left-most vertices on the parallel lines may represent occluded landmark points associated with the left portion of contour of the face on the second 2D projection 406B. As an example, vertices 410A, 410B, 410C, 410D, 410E, and 410F may be the left-most vertices on the parallel lines in the second aligned 3D mean-shape model 402B. The circuitry 202 may determine landmark points 412A, 412B, 412C, 412D, 412E, and 412F in the second 2D projection 406B as landmark points on the contour of the face, which may correspond to the vertices 410A, 410B, 410C, 410D, 410E, and 410F based on the landmark marching method.

It should be noted that the first scenario 400A and the second scenario 400B are merely provided as two separate examples and should not be construed as limiting for the present disclosure.

FIG. 5 is a diagram that illustrates an exemplary scenario for generation of a two-dimensional (2D) projection of an aligned three-dimensional (3D) mean-shape model, in accordance with an embodiment of the disclosure. FIG. 5 is described in conjunction with elements from FIGS. 1, 2, 3, 4A, and 4B. With reference to FIG. 5, there is shown an exemplary scenario 500. The scenario 500 includes a pipeline of operations that may be executed any suitable computing unit, such as by the circuitry 202 to generate a 2D projection of an aligned 3D mean-shape model.

At 502, a 3D-to-2D projection may be performed. In an embodiment, the circuitry 202 may be configured to execute a 3D-to-2D projection on the aligned 3D mean-shape model (e.g., the aligned 3D mean-shape model 324) to generate a 2D projection. To generate the 2D projection, the circuitry 202 may be configured to project the aligned mean-shape model 324 onto a 2D image plane. The projection may be based on one or more alignment parameters associated with an imaging device (e.g., the image sensor 106A of the sensing device 106) which captured the color image (e.g., the color image 316). Examples of the one or more alignment parameters associated with the image sensor 106A may include, but are not limited to, a focal length, an aperture, an image sensor format, a principal point, a scale factor, and a lens distortion, associated with the image sensor 106A. Shown as an example, the circuitry 202 may generate a 2D projection 506 from the aligned 3D mean-shape model 324.

At 504, a triangle index map may be generated. In an embodiment, the circuitry 202 may be configured to generate the triangle index map. The aligned 3D mean-shape model 324 may include a 3D mesh of triangles to represent a 3D shape model of the face of the user 110. For each pixel of the 2D projection 506, the circuitry 202 may determine an index of a triangle on the aligned 3D mean-shape model 324 to which a corresponding pixel of the 2D projection 506 may belong to. The circuitry 202 may record the determined index for each pixel of the 2D projection 506 to generate a triangle index map. Shown as an example, the circuitry 202 may generate a triangle index map 508. The triangle index map 508 may be of the same dimensions as the 2D projection 506. Each pixel of the triangle index map 508 may include an index of a triangle in the 3D mesh of triangles in the aligned 3D mean-shape model 324.

Figure 6:
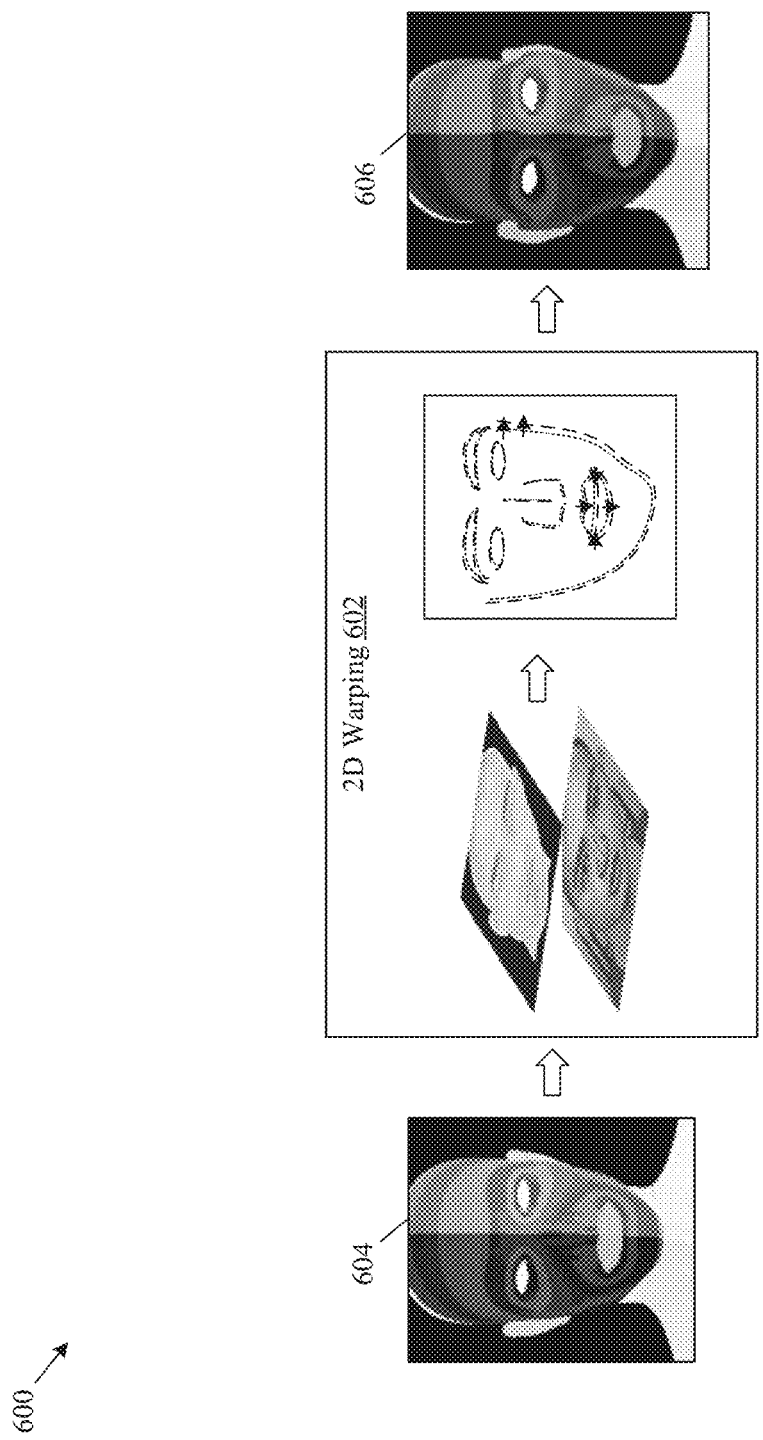
FIG. 6 is a diagram that illustrates an exemplary scenario for warping of a two-dimensional (2D) projection of an aligned three-dimensional (3D) mean-shape model, in accordance with an embodiment of the disclosure.

FIG. 6 is a diagram that illustrates an exemplary scenario for warping of a two-dimensional (2D) projection of an aligned three-dimensional (3D) mean-shape model, in accordance with an embodiment of the disclosure. FIG. 6 is described in conjunction with elements from FIGS. 1, 2, 3, 4A, 4B, and 5. With reference to FIG. 6, there is shown an exemplary scenario 600. The scenario 600 includes an operation 602 that may be executed by the circuitry 202 to warp a 2D projection of an aligned 3D mean-shape model. In the scenario 600 of FIG. 6, there is further shown a triangle index map 604 associated with the aligned 3D mean-shape model. In the scenario 600, there is further shown a warped triangle index map 606 that may be generated on an update of the triangle index map 604 based on the warping of the 2D projection.

At 602, a 2D warping of the 2D projection may be performed. In an embodiment, the circuitry 202 may be configured to warp the 2D projection (e.g., the 2D projection 326) based on an overlay of the acquired color image (e.g., the color image 316) over the 2D projection 326. The warping of the 2D projection 326 may include an alignment of the set of landmark points 328 in the 2D projection 326 with the corresponding set of feature points 330 in the acquired color image 316 of the face of the user 110. For example, the alignment based on the warping of the 2D projection 326 may be represented by the splines 332.

In an embodiment, the circuitry 202 may update indices of triangles in the triangle index map 604 based on the warping of the 2D projection 326. The indices of triangles in the triangle index map 604 may be updated based on an application of a Moving Least Squares (MLS) morphing method on the triangle index map 604. According to the MLS morphing method, for each point "v" in the triangle index map 604 image, the circuitry 202 may determine an optimum Affine transformation "$I_v(x)$" that may minimize a least square term represented in (3), as follows:

$$\sum_i w_i |\hat{p}_i M - \hat{q}_i|^2 \text{ where,} \qquad (3)$$

$w_i$: weight, $w_i = \dfrac{1}{|p_i - v|^2}$, $I_v(x)$: Affine transformation, $I_v(x) = (x - p_*)M + q_*$, $p_i$ and $q_i$: row vectors, $M$: a linear transformation matix, $p^*$: a weighted centroid, $p_* = \dfrac{\sum_i w_i p_i}{\sum_i w_i}$, $q^*$: a weighted centroid, $q_* = \dfrac{\sum_i w_i q_i}{\sum_i w_i}$, $\hat{p}_i = p_i - p_*$, and $\hat{q}_i = q_i - q_*$.

In an embodiment, the circuitry 202 may warp the triangle index map 604 to generate the warped triangle index map 606 based on the update. The warped triangle index map 606 may include the updated pixel values of the triangle index map 604. It should be noted that the scenario 600 is for exemplary purpose and should not be construed as limiting for the present disclosure.

Figure 7:
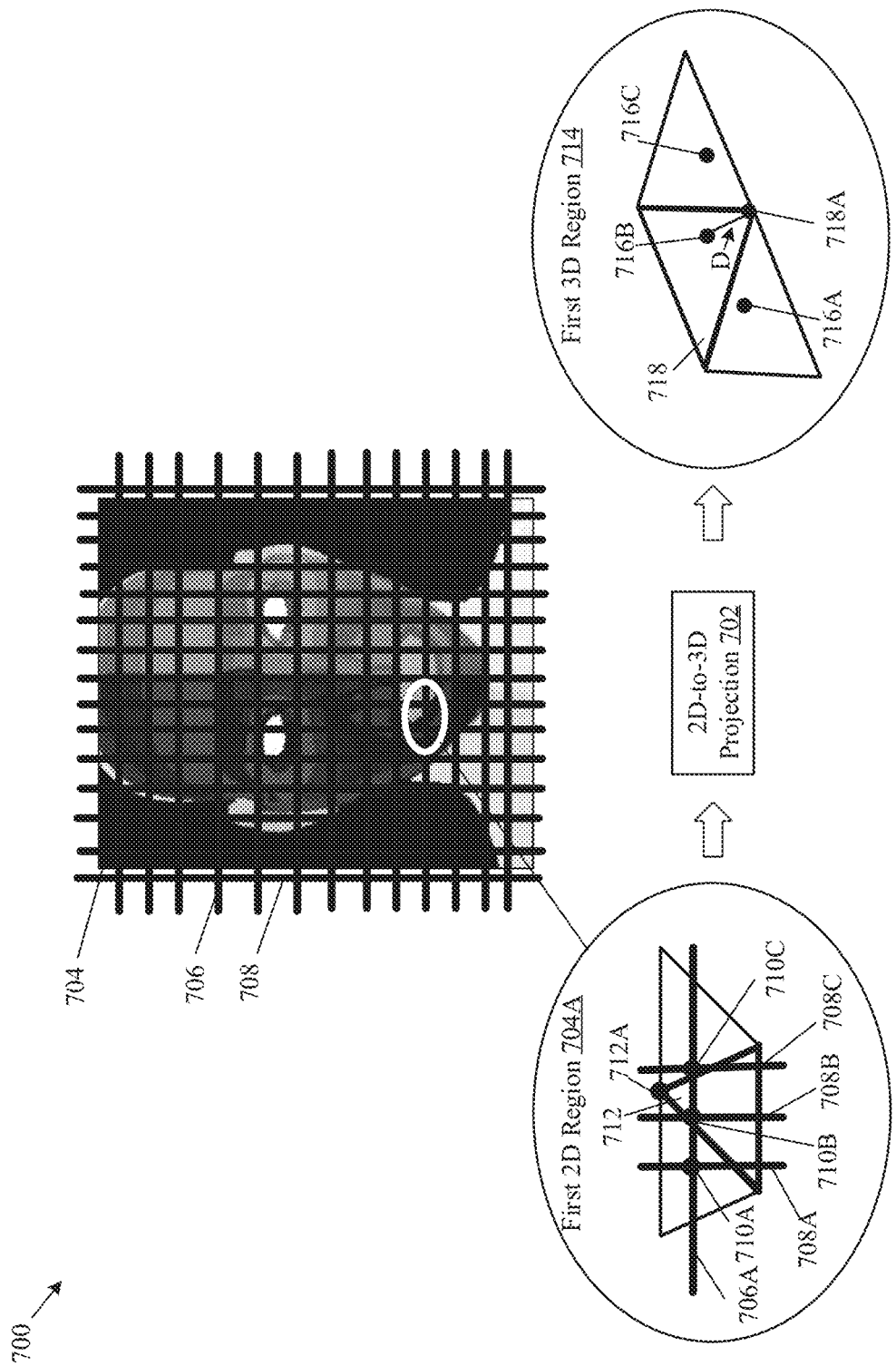
FIG. 7 is a diagram that illustrates an exemplary scenario for three-dimensional (3D) correspondence determination for a non-rigid alignment of an aligned 3D mean-shape model, in accordance with an embodiment of the disclosure.

FIG. 7 is a diagram that illustrates an exemplary scenario for a three-dimensional (3D) correspondence determination for a non-rigid alignment of an aligned 3D mean-shape model, in accordance with an embodiment of the disclosure. FIG. 7 is described in conjunction with elements from FIGS. 1, 2, 3, 4A, 4B, 5, and 6. With reference to FIG. 7, there is shown an exemplary scenario 700. The scenario 700 includes an operation 702 that may be executed by the circuitry 202 to determine a 3D correspondence for a non-rigid alignment of an aligned 3D mean-shape model (e.g., the aligned 3D mean-shape model 324). In the scenario 700 of FIG. 7, there is further shown a warped triangle index map 704 associated with the aligned 3D mean-shape model. In the scenario 700, there are further shown a plurality of horizontal lines 706 and a plurality of vertical lines 708 overlaid on the warped triangle index map 704. A point of intersection between a horizontal line from the plurality of horizontal lines 706 and a vertical line from the plurality of vertical lines 708 may be a pixel of the warped triangle index map 704. Each pixel of the warped triangle index map 704 may correspond to an index of a triangle from a mesh of triangles in the aligned 3D mean-shape model.

As shown in FIG. 7, the warped triangle index map 704 may include a first 2D region 704A. For the sake of brevity, the determination of the 3D correspondence is described using the first 2D region 704A in the warped triangle index map 704. The first 2D region 704A may include a horizontal line 706A and a set of vertical lines 708A, 708B, and 708C. A set of pixels 710A, 710B, 710C in the first 2D region 704A may be respective points of intersection of the horizontal line 706A and the set of vertical lines 708A, 708B, and 708C in the first 2D region 704A. In the first 2D region 704A, there is further shown a set of triangles whose indices may correspond to a value recorded in the set of pixels 710A, 710B, and 710C. Shown as an example, a first triangle 712 in the first 2D region 704A may correspond the pixel 710B. The pixel 710B may record an index associated with the first triangle 712. The first triangle 712 may belong to the mesh of triangles in the aligned 3D mean-shape model. Also shown in FIG. 7 is a first vertex 712A of the first triangle 712. For the sake of brevity, the determination of the 3D correspondence is described using the first triangle 712 and the first vertex 712A.

At 702, a 2D-to-3D projection of the first 2D region 704A may be determined. In an embodiment, the circuitry 202 may be configured to determine the 2D-to-3D projection of the first 2D region 704A of the warped triangle index map 704. Based on the 2D-to-3D projection, the circuitry 202 may generate a 3D region in 3D space corresponding to the first 2D region 704A in 2D space. As an example, the circuitry 202 may generate a first 3D region 714 in the 3D space corresponding to the first 2D region 704A in the 2D space.

In the first 3D region 714, there is shown a set of 3D points 716A, 716B, and 716C corresponding to respective 2D points of the set of pixels 710A, 710B, and 710C in the first 2D region 704A. There is further shown a first triangle 718 and a first vertex 718A of the first triangle 718 in the first 3D region 714. The first triangle 718 and the first vertex 718A in the first 3D region 714 may correspond to the first triangle 712 and the first vertex 712A in the first 2D region 704A, respectively.

The circuitry 202 may be configured to determine a 3D correspondence between the aligned 3D mean-shape model (e.g., the aligned 3D mean-shape model 324) and the acquired point cloud (e.g., the point cloud 320), for a non-rigid alignment of the aligned 3D mean-shape model 324. The determination of the 3D correspondence may be based on the warped 2D projection (as obtained by alignment of the splines 332, for example) and the acquired depth information (e.g., the depth information 318).

For example, the circuitry 202 may determine 2D coordinates of various points in the first 3D region 714 from corresponding points of the warped 2D projection. Further, the circuitry 202 may determine a "Z" coordinate of each point in the first 3D region 714 from the depth information of each corresponding point in the warped 2D projection. In another embodiment, the circuitry 202 may determine 3D positions corresponding to pixels of the warped 2D projection (as obtained by alignment of the splines 332, for example) based on the acquired depth information (e.g., the depth information 318) and 2D coordinate information of corresponding pixels in the acquired color image (e.g., the color image 316).

The warped 2D projection and the warped triangle index map 704 may be of the same dimensions. Thus, the pixels of the warped 2D projection may be the same as the pixels of the warped triangle index map 704. The circuitry 202 may determine 3D positions in 3D space (e.g., the first 3D region 714) corresponding to the set of pixels 710A, 710B, and 710C in the first 2D region 704A. For example, the 3D positions of the set of points 716A, 716B, and 718C in the first 3D region 714 may correspond to the set of pixels 710A, 710B, and 710C.

In an embodiment, the determination of the 3D correspondence between aligned 3D mean-shape model and the acquired point cloud may be further based on the warped triangle index map (e.g., the warped triangle index map 704). Once the various points of the first 3D region 714 may be determined, the circuitry 202 may determine the 3D correspondence based on the warped triangle index map 704.

In an embodiment, to determine the 3D correspondence, the circuitry 202 may be configured to determine a first 3D position from among the determined 3D positions corresponding to the pixels of the warped 2D projection (or the warped triangle index map 704). The determined first 3D position may be closest to a vertex of a first triangle indexed in the warped triangle index map 704. The first 3D position may be determined to be closest based on the warped triangle index map 704. For example, the circuitry 202 may determine the first 3D position as a 3D position of the point 716B, which may be closest to the first vertex 718A of the first triangle 718, indexed in the warped triangle index map 704. As an example, the point 716B may be at a distance "D" (as shown in FIG. 7) from the first vertex 718A and the distance "D" may be smaller than each of a first distance between the point 716A and the first vertex 718A and a second distance between the point 716C and the first vertex 718A.

In an embodiment, the circuitry 202 may be configured to assign the determined first 3D position as a first correspondence for the vertex of the first triangle. As an example, the circuitry 202 may assign the 3D position (i.e., the first 3D position) of the point 716B as the first correspondence for the first vertex 718A of the first triangle 718.

In an embodiment, the 3D correspondence between the aligned 3D mean-shape model (e.g., the 3D mean-shape model 322) and the acquired point cloud (e.g., the point cloud 320) may be determined based on the assignment for each vertex of the aligned 3D mean-shape model. A 3D position corresponding to a first pixel in the warped triangle index map 704 may be determined. The first pixel may correspond to an index of a triangle in the mesh of triangles of the aligned 3D mean-shape model. If it is determined that the 3D position of the first pixel is closest to a certain vertex of the triangle than 3D positions of other pixels of the warped triangle index map 704, the 3D position of the first pixel may be assigned as a 3D correspondence for the vertex of the triangle. The 3D correspondence for a vertex of a triangle in the mesh of triangles, determined based on a proximity of 3D positions of pixels of the warped triangle index map 704 to the vertex may be an accurate approximation for the 3D correspondence. Further, the determination of the 2D-to-3D projection and the calculation of the proximity (i.e., distances) of the 3D positions to the vertex for the determination of the 3D correspondence for the vertex may be a less time intensive process than a conventional method of direct 3D deformation for non-rigid alignment. Thus, the determination of such 3D correspondence between the aligned 3D mean-shape model and the acquired point cloud based on the warped 2D projection (or the warped triangle index map) may be a more accurate and less time intensive method for non-rigid alignment of the aligned 3D mean-shape model, as compared to conventional methods. The scenario 700 is merely provided as an example and should not be construed as limiting for the present disclosure.

Figure 8:
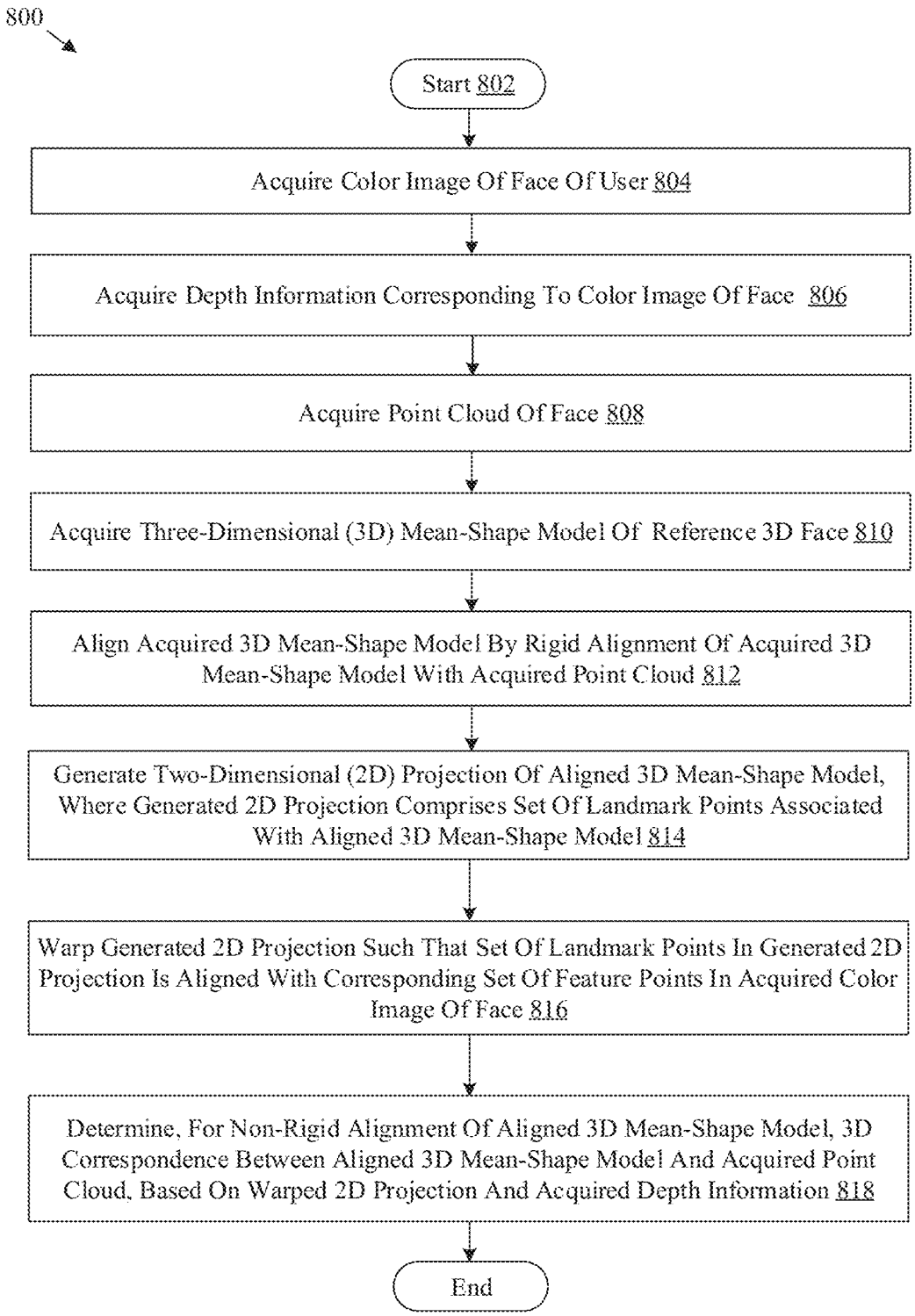
FIG. 8 is a flowchart that illustrates exemplary operations for three-dimensional (3D) shape modeling based on two-dimensional (2D) warping, in accordance with an embodiment of the disclosure.

FIG. 8 is a flowchart that illustrates exemplary operations for a three-dimensional (3D) shape modeling based on a two-dimensional (2D) warping, in accordance with an embodiment of the disclosure. FIG. 8 is described in conjunction with elements from FIGS. 1, 2, 3, 4A, 4B, 5, 6, and 7. With reference to FIG. 8, there is shown a flowchart 800. The flowchart 800 may include operations 804 to 818 may be implemented in the electronic device 102. The flowchart 800 may start at 802 and proceed to 804.

At 804, the color image (e.g., the color image 316) of the face of the user 110 may be acquired. In an embodiment, the circuitry 202 of the electronic device 102 may be configured to acquire the color image 316 of the face of the user 110. In an embodiment, the image sensor 106A of the sensing device 106 may capture the color image 316 of the face of the user 110. The sensing device 106 may transmit the captured color image 316 to the circuitry 202, via the communication network 108.

At 806, the depth information (e.g., the depth information 318) corresponding to the color image (e.g., the color image 316) of the face of the user 110 may be acquired. In an embodiment, the circuitry 202 may be configured to acquire the depth information 318 from the sensing device 106. In an embodiment, the depth information 318 may be acquired from a viewpoint which may be same as that of the color image 316.

At 808, the point cloud (e.g., the point cloud 320) of the face may be acquired. In an embodiment, the circuitry 202 may be configured to acquire the point cloud 320 of the face based on the acquired color image 316 and the acquired depth information 318. The acquisition of the point cloud 320 is described further, for example, in FIG. 3.

At 810, the three-dimensional (3D) mean-shape model (e.g., the 3D mean-shape model 322) of the reference 3D face may be acquired. In an embodiment, the circuitry 202 may be configured to acquire the 3D mean-shape model 322 of the reference 3D face. In case the 3D mean-shape model 322 is stored in the memory 204 of the electronic device 102, the acquisition of the 3D mean-shape model 322 may correspond to extraction of the 3D mean-shape model 322 from the memory 204. Alternatively, in a scenario in which the 3D mean-shape model 322 is stored on the server 104, the acquisition of the 3D mean-shape model 322 may include a reception of the 3D mean-shape model 322 from the server 104, via the communication network 108.

At 812, the acquired 3D mean-shape model 322 may be aligned by a rigid alignment of the acquired 3D mean-shape model 322 with the acquired point cloud 320. In an embodiment, the circuitry 202 may be configured to rigid align the acquired 3D mean-shape model 322 with the acquired point cloud 320 to generate an aligned 3D mean-shape model (e.g., the aligned 3D mean-shape model 324). The rigid alignment of the acquired 3D mean-shape model 322 to generate the aligned 3D mean-shape model 324 is described further, for example, in FIG. 3.

At 814, a two-dimensional (2D) projection (e.g., the 2D projection 326) of the aligned 3D mean-shape model 324 may be generated. In an embodiment, the circuitry 202 may be configured to generate the 2D projection 326 of the aligned 3D mean-shape model 324. To generate the 2D projection 326, the circuitry 202 may project the aligned mean-shape model 324 onto a 2D image plane based on one or more alignment parameters associated with an imaging device (e.g., the image sensor 106A of the sensing device 106) that captured the color image 316. In an embodiment, the generated 2D projection 326 may include a set of landmark points (e.g., the set of landmark points 328) associated with the aligned 3D mean-shape model 324. The generation of the 2D projection 326 is described further, for example, in FIGS. 3 and 5.

At 816, the generated 2D projection 326 may be warped such that the set of landmark points 328 in the generated 2D projection 326 may be aligned with a corresponding set of feature points (e.g., the set of feature points 330) in the acquired color image 316 of the face. In an embodiment, the circuitry 202 may be configured to warp the generated 2D projection 326 such that the set of landmark points 328 may be aligned with the set of feature points 330. The warping of the generated 2D projection 326 is described further, for example, in FIGS. 3 and 6.

At 818, a 3D correspondence may be determined between the aligned 3D mean-shape model 324 and the acquired point cloud 320 for a non-rigid alignment of the aligned 3D mean-shape model 324. In an embodiment, the circuitry 202 may be configured to determine the 3D correspondence between the aligned 3D mean-shape model 324 and the acquired point cloud 320 for the non-rigid alignment of the aligned 3D mean-shape model 324. Such determination of the 3D correspondence may be done based on the warped 2D projection (as obtained by alignment of the splines 332, for example) and the acquired depth information 318. The determination of the 3D correspondence is described further, for example, in FIGS. 3 and 7. Control may pass to the end.

Although the flowchart 800 is illustrated as discrete operations, such as 802, 804, 806, 808, 810, 812, 814, 816 and 818, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate an electronic device (for example, the electronic device 102). The instructions may cause the electronic device 102 to perform operations that include acquiring a color image (e.g., the color image 316) of a face of a user (e.g., the user 110), depth information (e.g., the depth information 318) corresponding to the color image 316 of the face, and a point cloud (e.g., the point cloud 320) of the face. The operations may further include acquiring a 3D mean-shape model (e.g., the 3D mean-shape model 322) of a reference 3D face and aligning the acquired 3D mean-shape model 322 by a rigid alignment of the acquired 3D mean-shape model 322 with the acquired point cloud 320. The operations may further include generating a 2D projection (e.g., the 2D projection 326) of the aligned 3D mean-shape model (e.g., the aligned 3D mean-shape model 324). The generated 2D projection 326 may include a set of landmark points (e.g., the set of landmark points 328) associated with the aligned 3D mean-shape model 324. The operations may further include warping the generated 2D projection 326 such that the set of landmark points 328 in the generated 2D projection 326 is aligned with a corresponding set of feature points (e.g., the set of feature points 330) in the acquired color image 316 of the face. The operations may further include determining a 3D correspondence between the aligned 3D mean-shape model 324 and the acquired point cloud 320 for a non-rigid alignment of the aligned 3D mean-shape model 324. The 3D correspondence may be determined based on the warped 2D projection (as obtained by alignment of the splines 332, for example) and the acquired depth information 318.

Exemplary aspects of the disclosure may provide an electronic device (such as, the electronic device 102 of FIG. 1) that includes circuitry (such as, the circuitry 202). The circuitry 202 may be configured acquire a color image (e.g., the color image 316) of a face of a user (e.g., the user 110). The circuitry 202 may be further configured to acquire depth information (e.g., the depth information 318) corresponding to the color image 316 of the face. The circuitry 202 may be further configured to acquire a point cloud (e.g., the point cloud 320) of the face. The circuitry 202 may be further configured to acquire a 3D mean-shape model (e.g., the 3D mean-shape model 322) of a reference 3D face. The circuitry 202 may be further configured to align the acquired 3D mean-shape model 322 by a rigid alignment of the acquired 3D mean-shape model 322 with the acquired point cloud 320. The circuitry 202 may be further configured to generate a 2D projection (e.g., the 2D projection 326) of the aligned 3D mean-shape model (e.g., the aligned 3D mean-shape model 324). The generated 2D projection 326 may include a set of landmark points (e.g., the set of landmark points 328) associated with the aligned 3D mean-shape model 324. The circuitry 202 may be further configured to warp the generated 2D projection 326 such that the set of landmark points 328 in the generated 2D projection 326 may be aligned with a corresponding set of feature points (e.g., the set of feature points 330) in the acquired color image 316 of the face. The circuitry 202 may be further configured to determine a 3D correspondence between the aligned 3D mean-shape model 324 and the acquired point cloud 320 for a non-rigid alignment of the aligned 3D mean-shape model 324. The 3D correspondence may be determined based on the warped 2D projection (as obtained by alignment of the splines 332, for example) and the acquired depth information 318.

In an embodiment, the circuitry 202 may be further configured to acquire the point cloud 320 based on the acquired color image 316 and the acquired depth information 318.

In an embodiment, the circuitry 202 may be further configured to project the aligned 3D mean-shape model 324 onto a 2D image plane to generate the 2D projection 326. The projection may be based on one or more alignment parameters associated with an imaging device (e.g., the image sensor 106A of the sensing device 106) which captured the color image 316.

In an embodiment, the circuitry 202 may be further configured to acquire a plurality of pre-defined landmark points on the aligned 3D mean-shape model 324. The circuitry 202 may be configured to apply a landmark marching method on a subset of landmark points around a contour of the aligned 3D mean-shape model 324 to select the set of landmark points 328 from among the acquired plurality of pre-defined landmark points. The subset of landmark points 328 may be included in the detected plurality of landmark points, and the generated 2D projection 326 may include the selected set of landmark points 328.

In an embodiment, for each pixel of the 2D projection 326, the circuitry 202 may determine an index of a triangle on the aligned 3D mean-shape model 324 to which a corresponding pixel of the 2D projection 326 may belong. The circuitry 202 may be further configured to record the determined index for each pixel of the 2D projection 326 to generate a triangle index map (e.g., the triangle index map 508).

In an embodiment, the circuitry 202 may be configured to update indices of triangles in the triangle index map based on the warping of the generated 2D projection 326. The warping of the generated 2D projection 326 may include an alignment of the set of landmark points 328 in the generated 2D projection 326 with the corresponding set of feature points 330 in the acquired color image 316 of the face. The circuitry 202 may warp the triangle index map 508 based on the update. The indices of triangles in the triangle index map 508 are updated based on an application of a Moving Least Squares (MLS) morphing method on the triangle index map 508. The 3D correspondence between the aligned 3D mean-shape model 324 and the acquired point cloud 320 may be determined further based on the warped triangle index map (e.g., the warped triangle index map 606).

In an embodiment, the circuitry 202 may be configured to determine 3D positions corresponding to pixels of the warped 2D projection (as obtained by alignment of the splines 332, for example) based on the acquired depth information 318 and 2D coordinate information of corresponding pixels in the acquired color image 316. The circuitry 202 may be configured to determine, from among the determined 3D positions, a first 3D position (e.g., the 3D point 7168) to be closest to a vertex (e.g., the first vertex 718A) of a first triangle (e.g., the first triangle 718) indexed in the warped triangle index map (e.g., the warped triangle index map 704). The first 3D position (e.g., the 3D point 7168) may be determined to be closest based on the warped triangle index map 704. In an embodiment, the circuitry 202 may assign the determined first 3D position (e.g., the 3D point 7168) as a first correspondence for the vertex (e.g., the first vertex 718A) of the first triangle 718. The 3D correspondence between the aligned 3D mean-shape model 324 and the acquired point cloud 320 may be determined based on the assignment for each vertex of the aligned 3D mean-shape model 324.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
   circuitry configured to:
   acquire a color image of a face of a user;
   acquire depth information corresponding to the color image of the face;
   acquire a point cloud of the face;
   acquire a three-dimensional (3D) mean-shape model of a reference 3D face;
   align the acquired 3D mean-shape model by a rigid alignment of the acquired 3D mean-shape model with the acquired point cloud;
   generate a two-dimensional (2D) projection of the aligned 3D mean-shape model, wherein the generated 2D projection comprises a set of landmark points associated with the aligned 3D mean-shape model;
   determine, for each pixel of a plurality of pixels of the 2D projection, an index of a triangle on the aligned 3D mean-shape model to which a corresponding pixel of the plurality of pixels of the 2D projection belongs;
   record the determined index for each pixel of the plurality of pixels of the 2D projection to generate a triangle index map;
   warp the generated 2D projection such that the set of landmark points in the generated 2D projection is aligned with a corresponding set of feature points in the acquired color image of the face;
   update a plurality of indices of a plurality of triangles in the triangle index map based on a warp of the warped 2D projection, wherein the plurality of indices of the plurality of triangles includes the determined index of the triangle;
   warp the triangle index map based on the update of the plurality of indices of the plurality of triangles;
   determine a plurality of 3D positions corresponding to the plurality of pixels of the warped 2D projection based on the acquired depth information and 2D coordinate information of a plurality of corresponding pixels in the acquired color image;
   determine, from among the determined plurality of 3D positions, a first 3D position to be closest to a vertex of a first triangle of the plurality of triangles indexed in the warped triangle index map, wherein the first 3D position is determined to be closest based on the warped triangle index map;
   assign the determined first 3D position as a first correspondence for the vertex of the first triangle; and
   determine, for a non-rigid alignment of the aligned 3D mean-shape model, a 3D correspondence between the aligned 3D mean-shape model and the acquired point cloud, based on the assignment of the first correspondence for each vertex of the plurality of triangles of the aligned 3D mean-shape model.

2. The electronic device according to claim 1, wherein the circuitry is further configured to acquire the point cloud based on the acquired color image and the acquired depth information.

3. The electronic device according to claim 1, wherein the circuitry is further configured to project the aligned 3D mean-shape model onto a 2D image plane to generate the 2D projection, and wherein the projection is based on at least one alignment parameter associated with an imaging device which captured the color image.

4. The electronic device according to claim 3, wherein the at least one alignment parameter includes at least one of a focal length, an aperture, an image sensor format, a principal point, a scale factor, or a lens distortion of the imaging device.

5. The electronic device according to claim 1, wherein the circuitry is further configured to:
   acquire a plurality of landmark points on the aligned 3D mean-shape model; and
   execute a landmark marching method on a subset of landmark points of the plurality of landmark points model to select the set of landmark points from among the acquired plurality of landmark points, wherein the subset of landmark points is around a contour of the aligned 3D mean-shape model.

6. The electronic device according to claim 1, wherein the circuitry is further configured to update the plurality of indices of the plurality of triangles in the triangle index map based on an application of a Moving Least Squares (MLS) morphing method on the triangle index map.

7. A method, comprising:
   in an electronic device:
   acquiring a color image of a face of a user;
   acquiring depth information corresponding to the color image of the face;
   acquiring a point cloud of the face;
   acquiring a three-dimensional (3D) mean-shape model of a reference 3D face;
   aligning the acquired 3D mean-shape model by a rigid alignment of the acquired 3D mean-shape model with the acquired point cloud;
   generating a two-dimensional (2D) projection of the aligned 3D mean-shape model, wherein the generated 2D projection comprises a set of landmark points associated with the aligned 3D mean-shape model;
   determining, for each pixel of a plurality of pixels of the 2D projection, an index of a triangle on the aligned 3D mean-shape model to which a corresponding pixel of the plurality of pixels of the 2D projection belongs;
   recording the determined index for each pixel of the plurality of pixels of the 2D projection to generate a triangle index map;
   warping the generated 2D projection such that the set of landmark points in the generated 2D projection is aligned with a corresponding set of feature points in the acquired color image of the face;
   updating a plurality of indices of a plurality of triangles in the triangle index map based on a warp of the warped 2D projection, wherein the plurality of indices of the plurality of triangles includes the determined index of the triangle;
   warping the triangle index map based on the updating of the plurality of indices of the plurality of triangles;
   determining a plurality of 3D positions corresponding to the plurality of pixels of the warped 2D projection based on the acquired depth information and 2D coordinate information of a plurality of corresponding pixels in the acquired color image;
   determining, from among the determined plurality of 3D positions, a first 3D position to be closest to a vertex of a first triangle of the plurality of triangles indexed in the warped triangle index map, wherein the first 3D position is determined to be closest based on the warped triangle index map;

assigning the determined first 3D position as a first correspondence for the vertex of the first triangle; and determining, for a non-rigid alignment of the aligned 3D mean-shape model, a 3D correspondence between the aligned 3D mean-shape model and the acquired point cloud, based on the assignment of the first correspondence for each vertex of the plurality of triangles of the aligned 3D mean-shape model.

8. The method according to claim 7, further comprising acquiring the point cloud based on the acquired color image and the acquired depth information.

9. The method according to claim 7, further comprising projecting the aligned 3D mean-shape model onto a 2D image plane to generate the 2D projection, wherein the projection is based on at least one alignment parameter associated with an imaging device which captured the color image.

10. The method according to claim 7, further comprising:
acquiring a plurality of landmark points on the aligned 3D mean-shape model; and
executing a landmark marching method on a subset of landmark points of the plurality of landmark points for selecting the set of landmark points from among the acquired plurality of landmark points, wherein the subset of landmark points is around a contour of the aligned 3D mean-shape model.

11. The method according to claim 7, further comprising updating the plurality of indices of the plurality of triangles in the triangle index map based on an application of a Moving Least Squares (MLS) morphing method on the triangle index map.

12. A non-transitory computer-readable medium having stored thereon, computer-executable instructions that when executed by an electronic device, causes the electronic device to execute operations, the operations comprising:
acquiring a color image of a face of a user;
acquiring depth information corresponding to the color image of the face;
acquiring a point cloud of the face;
acquiring a three-dimensional (3D) mean-shape model of a reference 3D face;
aligning the acquired 3D mean-shape model by a rigid alignment of the acquired 3D mean-shape model with the acquired point cloud;
generating a two-dimensional (2D) projection of the aligned 3D mean-shape model, wherein the generated 2D projection comprises a set of landmark points associated with the aligned 3D mean-shape model;
determining, for each pixel of a plurality of pixels of the 2D projection, an index of a triangle on the aligned 3D mean-shape model to which a corresponding pixel of the plurality of pixels of the 2D projection belongs;
recording the determined index for each pixel of the plurality of pixels of the 2D projection to generate a triangle index map;
warping the generated 2D projection such that the set of landmark points in the generated 2D projection is aligned with a corresponding set of feature points in the acquired color image of the face;
updating a plurality of indices of a plurality of triangles in the triangle index map based on a warp of the warped 2D projection, wherein the plurality of indices of the plurality of triangles includes the determined index of the triangle;
warping the triangle index map based on the updating of the plurality of indices of the plurality of triangles;
determining a plurality of 3D positions corresponding to the plurality of pixels of the warped 2D projection based on the acquired depth information and 2D coordinate information of a plurality of corresponding pixels in the acquired color image;
determining, from among the determined plurality of 3D positions, a first 3D position to be closest to a vertex of a first triangle of the plurality of triangles indexed in the warped triangle index map, wherein the first 3D position is determined to be closest based on the warped triangle index map;
assigning the determined first 3D position as a first correspondence for the vertex of the first triangle; and
determining, for a non-rigid alignment of the aligned 3D mean-shape model, a 3D correspondence between the aligned 3D mean-shape model and the acquired point cloud, based on the assignment of the first correspondence for each vertex of the plurality of triangles of the aligned 3D mean-shape model.

* * * * *